United States Patent
Choi et al.

(10) Patent No.: US 10,318,802 B2
(45) Date of Patent: Jun. 11, 2019

(54) WORN BANKNOTE IDENTIFICATION METHOD AND ATM USING THE SAME

(71) Applicants: Nautilus Hyosung Inc., Seoul (KR); Industry-Academic Cooperation Foundation, Yonsei University, Seoul (KR)

(72) Inventors: Eui Sun Choi, Bucheon-si (KR); Yoon Kill Baek, Seoul (KR); Sang Wook Baek, Seoul (KR); Sang Hun Lee, Seoul (KR); Chul Hee Lee, Goyang-si (KR)

(73) Assignees: HYOSUNG TNS INC., Seoul (KR); INDUSTRY-ACADEMIC COOPERATION FOUNDATION, YONSEI UNIVERSITY, Seoul (KR)

(*) Notice: Subject to any disclaimer, the term of this patent is extended or adjusted under 35 U.S.C. 154(b) by 18 days.

(21) Appl. No.: 15/657,908

(22) Filed: Jul. 24, 2017

(65) Prior Publication Data
US 2018/0032805 A1    Feb. 1, 2018

(30) Foreign Application Priority Data
Jul. 27, 2016   (KR) .................. 10-2016-0095279

(51) Int. Cl.
*G06K 9/00*   (2006.01)
*G06K 9/46*   (2006.01)
(Continued)

(52) U.S. Cl.
CPC ....... *G06K 9/00442* (2013.01); *G06K 9/4661* (2013.01); *G06K 9/6202* (2013.01);
(Continued)

(58) Field of Classification Search
CPC .... G06K 9/00442; G06K 9/78; G06K 9/6202; G06K 9/4661; G06K 9/6215; G07F 19/202
See application file for complete search history.

(56) References Cited

U.S. PATENT DOCUMENTS

| | | | |
|---|---|---|---|
| 2003/0035579 A1* | 2/2003 | Yang | G06T 5/009 382/169 |
| 2007/0146502 A1* | 6/2007 | Ahn | H04N 1/6027 348/229.1 |

(Continued)

FOREIGN PATENT DOCUMENTS

| | | | |
|---|---|---|---|
| CN | 106056559 | * 10/2016 | G06T 5/00 |
| JP | 2000-182115 A | 3/2000 | |

(Continued)

OTHER PUBLICATIONS

Ng et al ("An Improved Method for Image Thresholding based on the Valley-Emphasis Method", Asia-Pacific Signal and Information Processing Association Annual Summit and Conference, IEEE 2013, pp. 1-4), (Year: 2013).*

*Primary Examiner* — Amara Abdi
(74) *Attorney, Agent, or Firm* — Fenwick & West LLP (57) ABSTRACT

The present disclosure relates to a worn banknote identification method and an ATM (Automated Teller Machine) using the same, and more particularly, to a worn banknote identification method which acquires an image of a banknote inserted into an ATM, divides pixels of the acquired banknote image into a bright region and dark region depending on a brightness distribution of the banknote image, determines the wear level of the banknote by comparing a difference between the average brightness values of the two regions to a preset reference value, and separately stores the (Continued)

inserted banknote into a reject box depending on the wear level of the banknote, and an ATM using the same.

6 Claims, 5 Drawing Sheets

(51) Int. Cl.
  *G06K 9/62* (2006.01)
  *G06K 9/78* (2006.01)
  *G07F 19/00* (2006.01)
(52) U.S. Cl.
  CPC ............. *G06K 9/6215* (2013.01); *G06K 9/78* (2013.01); *G07F 19/202* (2013.01)

(56) References Cited

U.S. PATENT DOCUMENTS

| | | | | |
|---|---|---|---|---|
| 2011/0229696 | A1* | 9/2011 | Ratnukumar | G07D 7/187 |
| | | | | 428/172 |
| 2015/0348467 | A1* | 12/2015 | Gyu | G09G 3/3611 |
| | | | | 345/690 |
| 2016/0286114 | A1* | 9/2016 | Fan | H04N 5/2352 |
| 2016/0300420 | A1* | 10/2016 | Li | G07D 7/2016 |
| 2017/0049311 | A1* | 2/2017 | Borovinskih | H04N 7/183 |
| 2018/0042486 | A1* | 2/2018 | Yoshizawa | A61B 5/0013 |

FOREIGN PATENT DOCUMENTS

| | | | | | |
|---|---|---|---|---|---|
| JP | 2006-180252 | * | 7/2006 | ............. | H04N 5/232 |
| JP | 2011065280 | * | 3/2011 | ............... | B60R 1/00 |

* cited by examiner

WORN BANKNOTE IDENTIFICATION METHOD AND ATM USING THE SAME

CROSS-REFERENCE TO RELATED APPLICATION

This application claims priority to Republic of Korea Patent Application No. 10-2016-0095279 filed on Jul. 27, 2016, which is incorporated by reference herein in its entirety.

BACKGROUND

1. Technical Field

The present disclosure relates to a worn banknote identification method and an ATM (Automated Teller Machine) using the same, and more particularly, to a worn banknote identification method which acquires an image of a banknote inserted into an ATM, divides pixels of the acquired banknote image into a bright region and dark region depending on a brightness distribution of the banknote image, determines the wear level of the banknote by comparing a difference between the average brightness values of the two regions to a preset reference value, and separately stores the inserted banknote into a reject box depending on the wear level of the banknote, and an ATM using the same.

2. Related Art

ATM (Automated Teller Machine) represents an automated device that can assist a basic financial service such as deposit or withdrawal without a bank teller, regardless of time and place in connection with financial services. The ATM enables a customer to conduct a transaction such as withdrawal or deposit of cash through his operation using a medium such as a card or bankbook.

Recently, most companies have a five-day workweek. Thus, more and more people use an ATM or CD (Cash Dispenser) rather than personally go to bank. Therefore, the installation of the ATM has gradually spread, and the number of ATMs has gradually increased. The recent ATMs are implemented in consideration of various additional functions as well as main tasks. Continuously, various ATMs are being developed in order to improve bank competitiveness while satisfying customers' satisfactions.

Typically, an ATM includes an identification unit for identifying the kinds of banknotes inserted by customers and determining whether the banknotes are counterfeit banknotes and/or whether the banknotes are damaged. The ATM classifies the inserted banknotes according to the identification results of the identification unit, and stores the classified banknotes into the corresponding cassettes.

Figure 1:
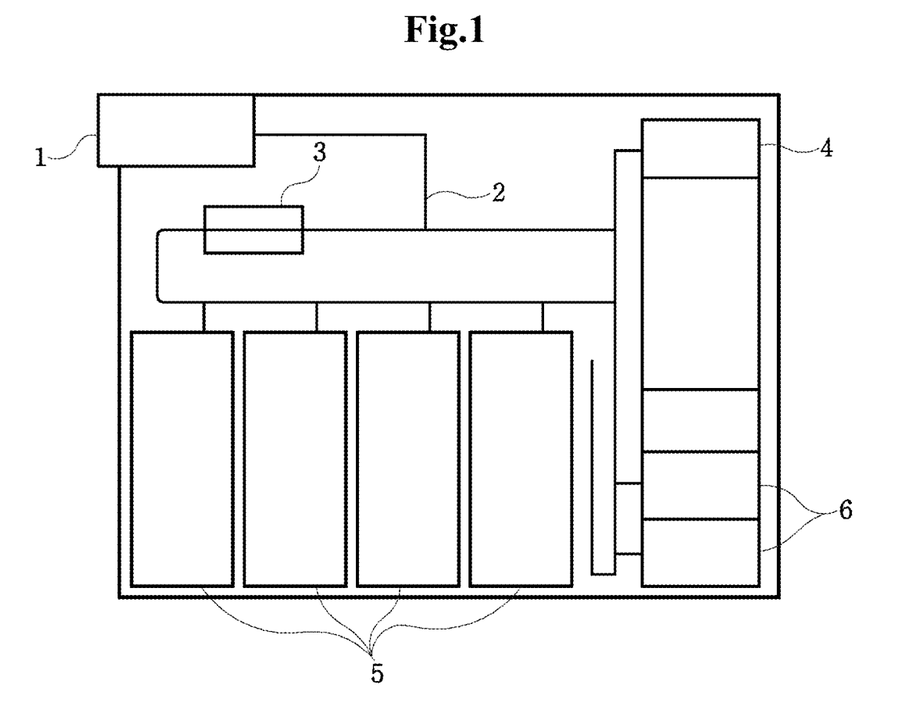
FIG. 1 is a diagram illustrating a conventional ATM.

FIG. 1 is a diagram illustrating a conventional ATM.

As illustrated in FIG. 1, the conventional ATM includes: a deposit/withdrawal unit 1 through which a customer inserts or receives banknotes for deposit or withdrawal; a transfer path 2 through which the banknotes deposited/withdrawn through the deposit/withdrawal unit 1 are transferred; a medium determination unit 3 installed on the transfer path 2 so as to determine whether the transferred banknotes are normal; a temporary storage unit 4 for temporarily storing the banknotes passed through the medium determination unit 3 until a transaction for the inserted banknotes is established; a plurality of banknote cassettes 5 for performing a recycling function by loading the banknotes inserted by the customer and providing the loaded banknotes; and a reject box 6 for collecting a banknote which is significantly damaged or worn among the banknotes inserted by the customer.

As such, when a banknote inserted by the customer is significantly damaged or worn, the banknote needs to be separately stored in the reject box so as not to be recycled. Korean Patent Publication No. 2016-0077671 has disclosed a banknote processing device that recognizes inserted banknotes to determine the kinds of the banknotes and whether the banknotes are counterfeit or whether the banknotes are damaged, and separately discharges the banknotes to one or two ore more load pockets installed in a discharge unit depending on the determination results.

As disclosed in Korean Patent Publication No. 2016-0077671, the banknote processing device can identify a damaged banknote by determining whether a tape is attached on the banknote through an ultrasonic sensor, detecting a torn or holey banknote through a contact image sensor, detecting a drowned banknote through an ultraviolet sensor, or detecting a banknote covered with scribbles through an infrared sensor.

However, although a banknote has not been damaged, the original color or concentration of ink printed on the banknote may fade or the banknote may be worn with time. Such a banknote needs to be separately stored so as not to be withdrawn to a customer. However, there are no techniques capable of effectively and accurately determining how worn the banknotes are. Therefore, even a banknote which must be determined to be a counterfeit or suspicious banknote or of which the recycling must be stopped may be processed and recycled as a normal banknote.

SUMMARY

Various embodiments are directed to a worn banknote identification method which acquires an image of a banknote inserted into an ATM, divides pixels of the acquired banknote image into a bright region and dark region depending on a brightness distribution of the banknote image, determines the wear level of the banknote by comparing a difference between the average brightness values of the two regions to a preset reference value, and separately stores the inserted banknote into a reject box depending on the wear level of the banknote, and an ATM using the same.

In an embodiment, there is provided a worn banknote identification method which determines the wear level of a banknote inserted into an ATM using an image of the banknote. The worn banknote identification method may include: acquiring an image of the banknote through an image sensor; calculating brightness values of pixels in the acquired banknote image by converting the banknote image into gray scales; extracting a threshold value for determining the variance of the brightness values of the pixels in the banknote image; dividing the pixels of the banknote image into a bright region and a dark region, based on the extracted threshold value; calculating a difference between the average brightness values of the two regions by calculating the average brightness value of the bright region and the average brightness value of the dark region; and determining whether the corresponding banknote is a worn banknote, by comparing the calculated difference to a preset reference value.

DETAILED DESCRIPTION

The present invention can be modified in various manners and embodied in various manners. Thus, specific embodiments will be described in detail with the reference to the accompanying drawings.

However, the present invention is not limited to the specific embodiments, but may include all modifications, equivalents and substitutions without departing the scope of the present invention. The terms such as first and second may be used for describing various elements, but the elements should not be limited by the terms. The terms are used only for distinguishing from one element from another element. For example, a first element may be referred to as a second element, and the second element may be referred to as the first element, without departing from the scope of the present invention.

The terms used in this specification are used only to describe specific embodiments, and do not limit the present invention. The terms of a singular form may include plural forms unless referred to the contrary. In this specification, the meaning of "include" or "have" specifies a property, number, step, process, element, part or combinations thereof, but does not exclude one or more other properties, numbers, steps, processes, elements, parts or combinations thereof.

Hereafter, specific embodiments of the present invention will be described in detail with reference to the accompanying drawings.

Figure 2:
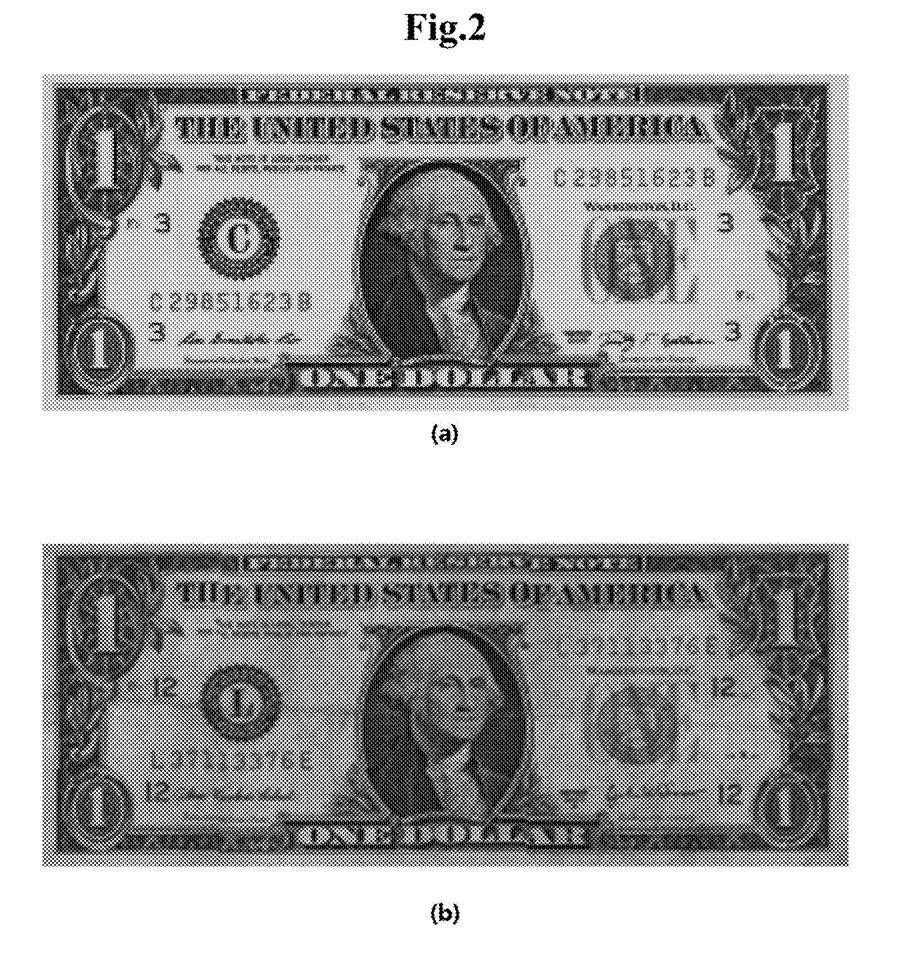
FIG. 2 shows images obtained by scanning a new banknote and worn banknote, respectively, in order to compare the new banknote which has been recently issued to the worn banknote which has been used for a predetermined period or more.

FIG. 2 shows images obtained by scanning a new banknote and worn banknote, respectively, in order to compare the new banknote which has been recently issued to the worn banknote which has been used for a predetermined period or more.

Referring to FIG. 2 which comparatively shows the scan images of the new banknote (a) and the worn banknote (b), a relatively dark-colored portion of the worn banknote (b) has faded and a relatively bright-colored portion of the worn banknote (b) has darkened due to stains or wrinkles, because the banknote (b) has been used for a long time. Furthermore, the worn banknote has a lower contrast and edge strength than the new banknote.

Figure 3:
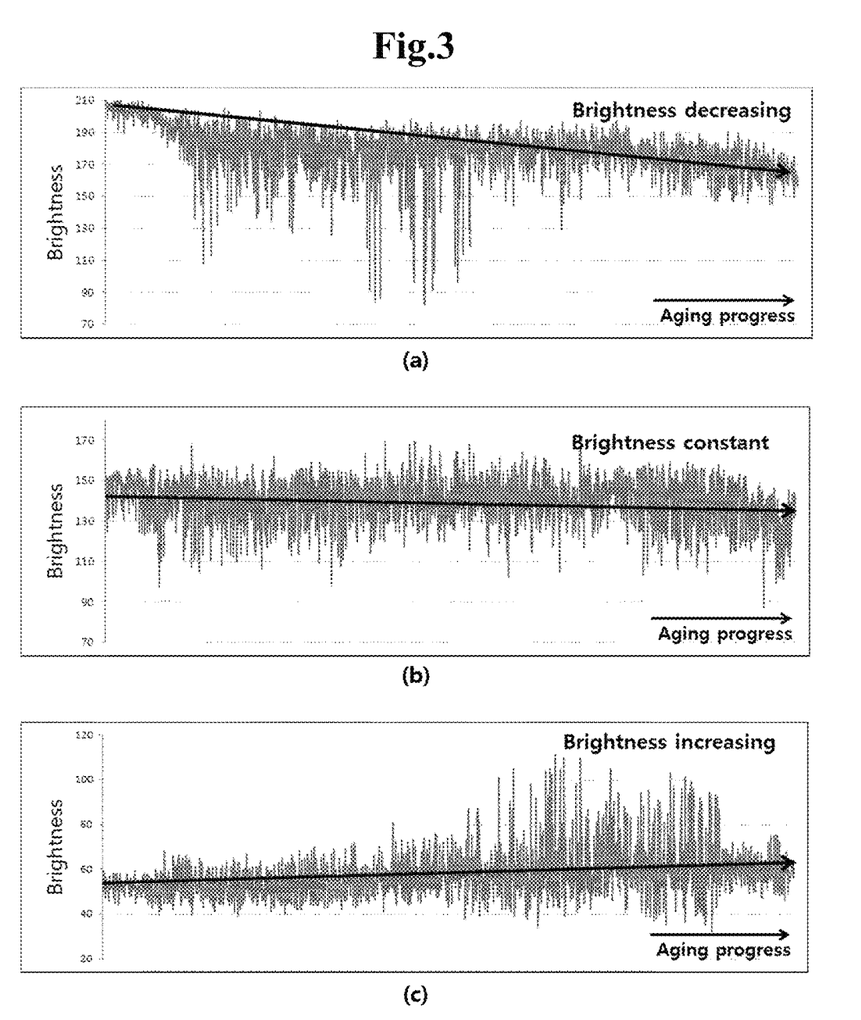
FIG. 3 includes graphs illustrating data obtained by scanning a banknote, wherein image pixels obtained by scanning the banknote are classified into a bright region, intermediate region and dark region depending on the brightness values of the image pixels, in order to show the changes of the brightness values in the respective regions depending on the period of use of the banknote.

FIG. 3 includes graphs illustrating data obtained by scanning a banknote. In FIG. 3, image pixels obtained by scanning the banknote may be classified into a bright region, intermediate region and dark region depending on the brightness values of the image pixels, in order to show the changes of the brightness values in the respective regions depending on the period of use of the banknote.

As illustrated in FIG. 3, the brightness values of the image pixels obtained by scanning the banknote may be classified into a bright region (a), an intermediate region (b) and a dark region (c), in order to compare the changes of the brightness values of the respective regions depending on the period of use of the banknote. In the bright region (a), the brightness values of the pixels gradually decrease because stains and wrinkles occur with the continuous use of the banknote. In the dark region (b), however, the brightness values of the pixels gradually increase because the colors thereof fade with the continuous use of the banknote. Furthermore, in the intermediate region (b), the brightness values of the pixels do not significantly change despite the continuous use of the banknote.

That is, the bright region of the worn banknote becomes darker than that of the new banknote, and the dark region of the worn banknote becomes brighter than that of the new banknote. Thus, the variance of the whole brightness values in the worn banknote becomes smaller than that of the new banknote. Based on the characteristic that the variance of the brightness values in the worn banknote becomes smaller than that of the new banknote, the worn banknote identification method may compare the variance of the brightness values of image pixels obtained by scanning a banknote, in order to determine how worn the banknote is. For this operation, the worn banknote identification method may extract a threshold value for determining the variance of the brightness values of the pixels in the banknote image, divide the pixels into a bright region and a dark region depending on the brightness values thereof based on the threshold value, calculate a difference between the average brightness values of the two regions, and compare the difference to a preset reference value, in order to determine how worn the banknote is.

Hereafter, the worn banknote identification method according to the embodiment of the present invention will be described with reference to FIGS. 4 and 5.

Figure 4:
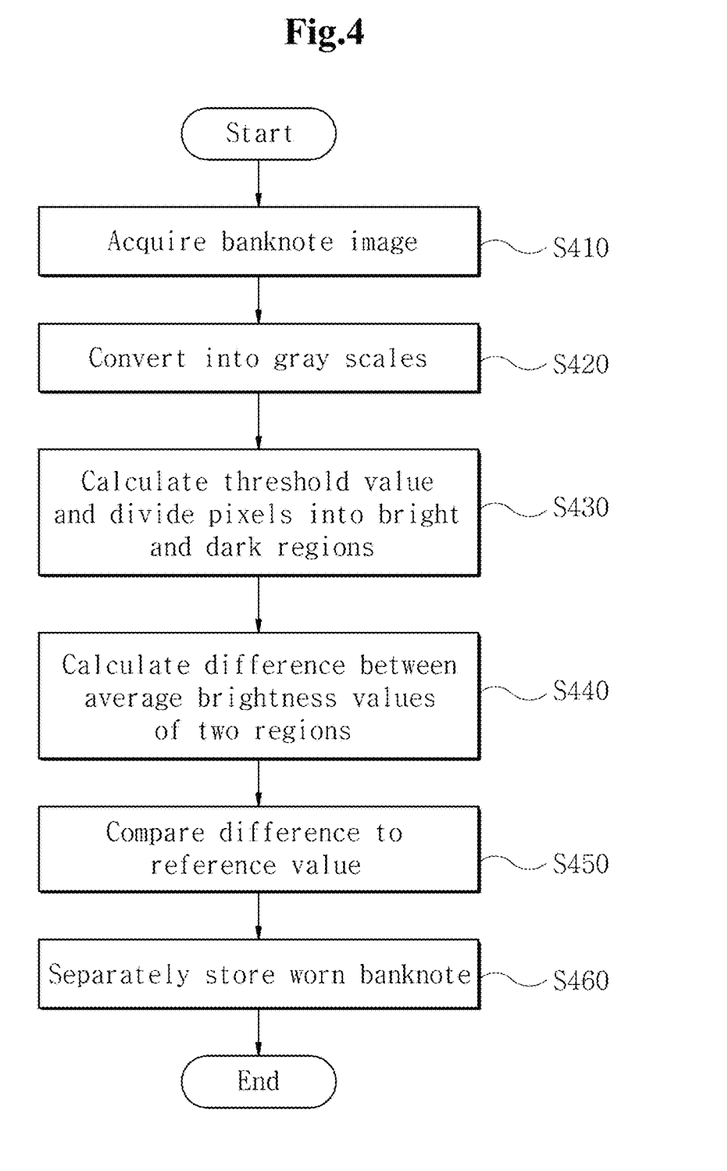
FIG. 4 is a flowchart illustrating a worn banknote identification method according to an embodiment of the present invention.

FIG. 4 is a flowchart illustrating the worn banknote identification method according to the embodiment of the present invention.

As illustrated in FIG. 4, the worn banknote identification method according to the embodiment of the present invention begins with step S410 of acquiring an image of a banknote transferred along a transfer path through an image sensor.

Then, the worn banknote identification method calculates the brightness values of pixels in the acquired banknote image by converting the banknote image into gray scales at step S420. During the gray scale conversion of the banknote image, the worn banknote identification method may extract only brightness signals by removing color signals from the acquired banknote image or extract only the brightness values of green data in the acquired banknote image, in order to calculate only the brightness values of the respective pixels in the banknote image.

Then, the worn banknote identification method extracts a threshold value for determining the variance of the brightness values of the pixels in the banknote image, and divides the pixels of the banknote image into a dark region and a bright region, based on the threshold value, at step S430.

At this time, the publicly-known Otsu thresholding algorithm may be used to extract the threshold value for determining the variance of the brightness values of the pixels. The Otsu thresholding algorithm aims to find a valley and set the valley to a threshold value T, under the supposition that the histogram shape of an image is bimodal. That is, the Otsu thresholding algorithm generates a graph based on the brightness values of the pixels in the banknote image, and divides the graph into two regions based on a threshold value at which the sum of variances corresponding to the two regions is minimized. Since the Otsu thresholding algorithm is generally used in image processing, the detailed descriptions are omitted herein.

Then, the worn banknote identification method calculates the average brightness value of the bright region and the average brightness value of the dark region, based on the threshold value, and calculates a difference between the average brightness values of the two regions, at step S440. Then, the worn banknote identification method determines how worn the banknote is, by comparing the difference to a preset reference value, at step S450.

Figure 5A:
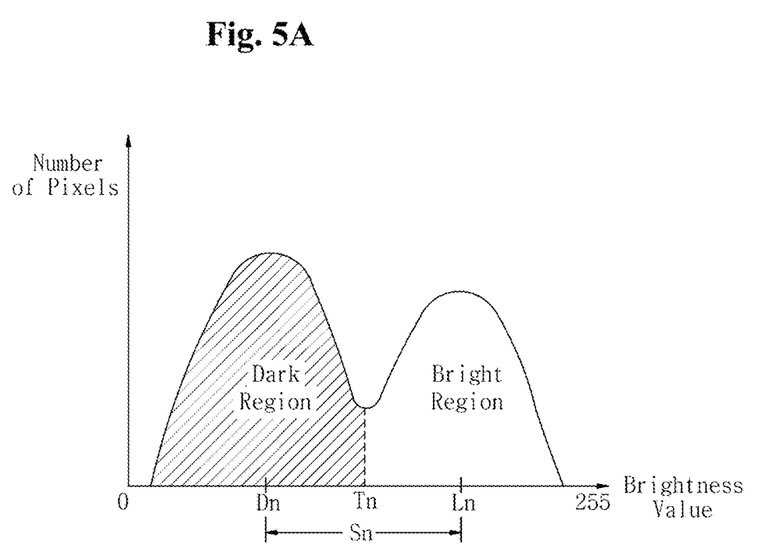
FIGS. 5A and 5B are graphs comparatively showing brightness value distributions of image pixels obtained by scanning a new banknote which has been recently issued and a worn banknote which has been used for a predetermined period or more.
Figure 5B:
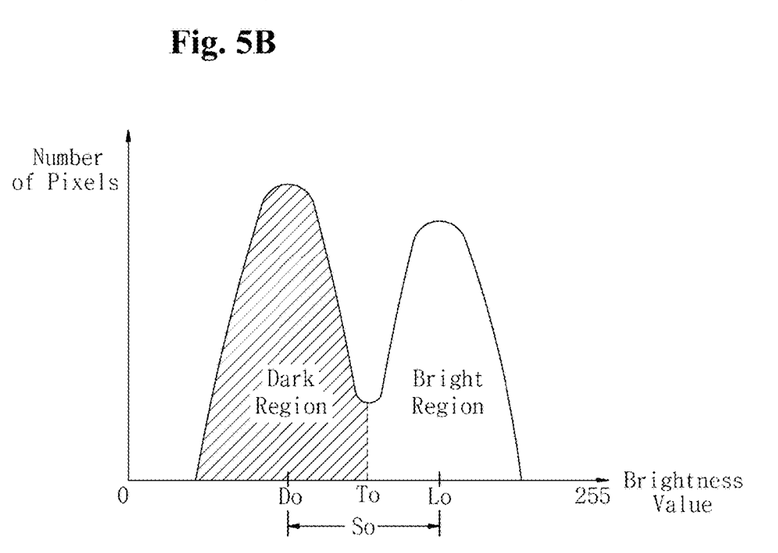

FIGS. 5A and 5B are graphs comparatively showing distributions of the image pixels obtained by scanning the new banknote which has been recently issued and the worn banknote which has been used for a predetermined period or more.

In FIGS. 5A and 5B, the X-axis indicates values obtained by dividing the brightness values into 0 to 255, and the Y-axis indicates the numbers of image sensor pixels corresponding to the respective brightness values.

As illustrated in FIGS. 5A and 5B, a difference So between the average brightness value Do of the dark region and the average brightness value Lo of the bright region in the worn banknote is smaller than a difference Sn between the average brightness value Dn of the dark region and the average brightness value Ln of the bright region in the new banknote.

In other words, since the bright region of the worn banknote becomes darker than that of the new banknote and the dark region of the worn banknote becomes brighter than that of the new banknote, the variance of the brightness values of the respective pixels in the image sensor, which are obtained by scanning each of the banknotes, may decrease. Therefore, with the decrease in variance of the brightness values of the pixels in the banknote image, the difference between the average brightness values of the dark region and the bright region decreases. This indicates that, as the banknote is worn, the difference between the average brightness values of the dark region and the bright region gradually decreases.

As such, the worn banknote identification method may extract the threshold value for determining the variance of the brightness values of the respective pixels in the image sensor, which are obtained by scanning the banknote, divide the pixels into the bright region and the dark region depending on the brightness values based on the threshold value, calculate the difference between the average brightness values of the two regions, compare the difference to the preset reference value, and determine that the corresponding banknote is a worn banknote when the difference is equal to or less than the preset reference value.

More specifically, the worn banknote identification method may convert the banknote image acquired through the image sensor into gray scales, and detect the brightness values of the respective pixels in the banknote image, which are classified into a total of L levels from 0 to (L−1). When the threshold value extracted to determine the variance of the brightness values of the respective pixels in the banknote image is represented by t and the number of pixels having a brightness value of i is represented by $n_i$, the difference $\delta_t$ between the average brightness values of the bright region and the dark region in the banknote image may be calculated as Equation 1 below.

$$\delta_t = \sum_{t}^{L-1} i n_i \bigg/ \sum_{t}^{L-1} n_i - \sum_{0}^{t-1} i n_i \bigg/ \sum_{0}^{t-1} n_i \qquad \text{[Equation 1]}$$

At this time, the difference $\delta_t$ may be defined as 'wear level' indicating how worn the corresponding banknote is, and compared to the reference value $\delta_t^{ref}$ which is preset to define the standard for banknotes which can be recycled, in order to identify whether the corresponding banknote is a worn banknote.

That is, the reference value $\delta_t^{ref}$ may indicate a minimum wear level which is required to determine whether a banknote can be recycled. The reference value $\delta_t^{ref}$ may be preset and stored through previous scan results for a plurality of worn banknotes. When the wear level of an identified banknote is equal to or less than the reference value, the corresponding banknote may be determined to be a worn banknote of which the recycling needs to be stopped.

When the corresponding banknote is determined to be a worn banknote through the above-described process, the banknote is separately stored in a reject box at step S460.

As described above, the worn banknote identification method may acquire an image of a banknote inserted into the ATM, divide the pixels of the acquired image into a bright region and a dark region depending on the brightness distribution of the image, and determine the wear level of the corresponding banknote by comparing a difference between the average brightness values of the two regions to the preset reference value. Therefore, the worn banknote identification method can effectively determine the wear level of the inserted banknote, and separately store a worn banknote of which the recycling needs to be stopped, into the reject box.

While various embodiments have been described above, it will be understood to those skilled in the art that the embodiments described are by way of example only. Accordingly, the disclosure described herein should not be limited based on the described embodiments.

What is claimed is:

1. A worn banknote identification method which determines the wear level of a banknote inserted into an ATM using an image of the banknote, comprising:
   acquiring an image of the banknote through an image sensor;
   calculating brightness values of pixels in the acquired banknote image by converting the banknote image into gray scales;
   extracting a threshold value for determining the variance of the brightness values of the pixels in the banknote image;
   dividing the pixels of the banknote image into a bright region and a dark region, based on the extracted threshold value;
   calculating a difference between the average brightness values of the bright region and the dark region by calculating the average brightness value of the bright region and the average brightness value of the dark region; and
   determining whether the banknote is a worn banknote, by comparing the calculated difference to a preset reference value, wherein a minimum wear level required to determine whether the banknote is recyclable is preset through a previous scan operation and stored as the reference value, and the banknote is determined to worn when the calculated difference is equal to or less than the reference value.

2. The worn banknote identification method of claim 1, wherein the calculating of the brightness values of the pixels in the banknote image comprises extracting only brightness signals by removing color signals from the image of the inserted banknote.

3. The worn banknote identification method of claim 1, wherein the calculating of the brightness values of the pixels in the banknote image comprises extracting only brightness values of green data from the image of the inserted banknote.

4. The worn banknote identification method of claim 1, wherein the extracting of the threshold value comprises extracting the threshold value using the Otsu thresholding algorithm.

5. The worn banknote identification method of claim 4, wherein the extracting of the threshold value using the Otsu thresholding algorithm comprises finding a valley in a distribution graph of the brightness values of the pixels and extracting the valley as the threshold value.

6. The worn banknote identification method of claim 1, wherein in the calculating of the difference between the average brightness values of the two regions, Equation 2 below is applied:

$$\delta_t = \sum_{t}^{L-1} i n_i \bigg/ \sum_{t}^{L-1} n_i - \sum_{0}^{t-1} i n_i \bigg/ \sum_{0}^{t-1} n_i \qquad \text{[Equation 2]}$$

where $\delta_t$ represents the difference between the average brightness values of the bright region and the dark region, L represents the number of brightness value levels, t represents the threshold value, i represents a brightness value, and $n_i$ represents the number of pixels having the brightness value i.

\* \* \* \* \*